May 12, 1964 R. ATWOOD ET AL 3,132,817
TEXTILE BOBBIN AND DRIVE SHAFT THEREFOR
Filed Sept. 27, 1957 3 Sheets-Sheet 1
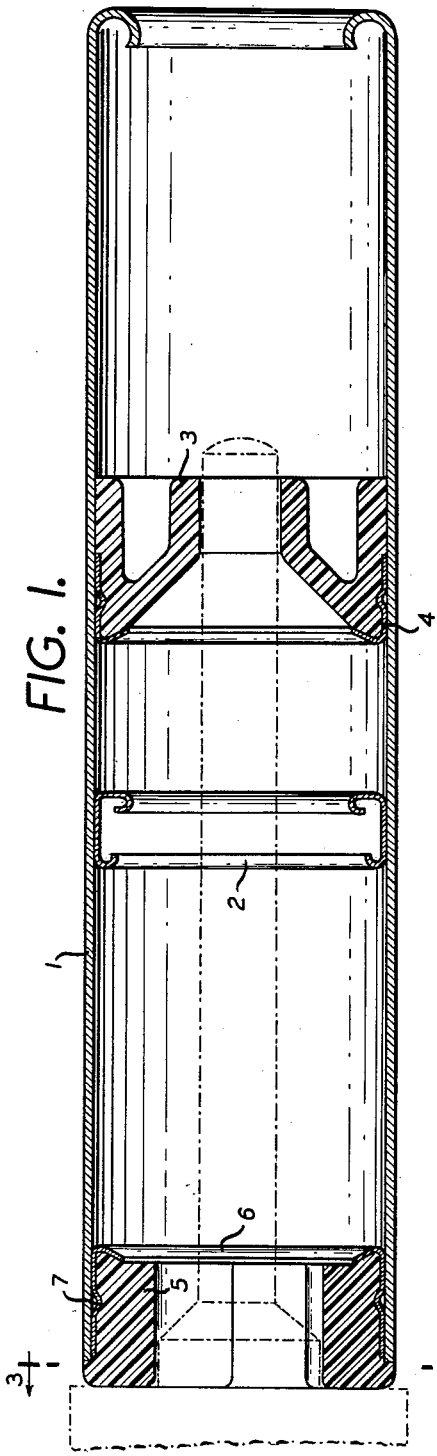
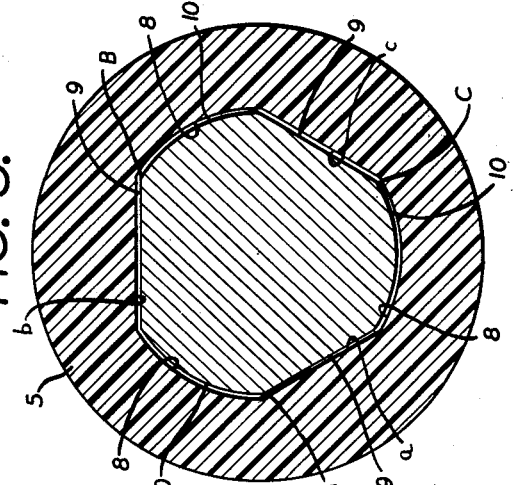
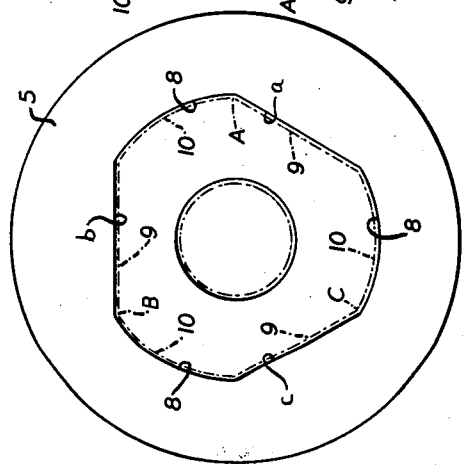
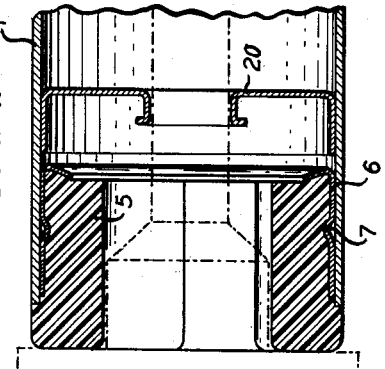
INVENTORS 3,132,817
TEXTILE BOBBIN AND DRIVE SHAFT THEREFOR
Rawson Atwood, Buttonwood Lane, Rumson, N.J., and
  Charles C. L'Allemand, 168 The Fellsway, Murray
  Hill, N.J.
Filed Sept. 27, 1957, Ser. No. 686,677
3 Claims. (Cl. 242—46.21)

This invention relates to improvements in textile bobbins, and more particularly to such bobbins as are mounted on and driven by vertical spindles.

The invention is concerned primarily with the centering and drive engagement of bobbins, the general objects being to provide accurate centering, to eliminate looseness of parts and to eliminate vibration and wear.

In the usual bobbin construction, the bobbin has one or more internal bearings which receive or fit around the spindle and suitable recesses cooperating with drive lugs or other elements in the base of the spindle to form a driving engagement. The necessary manufacturing tolerances limit the accuracy of fit and result in a certain amount of eccentricity and vibration which may be very objectionable at high speeds, and the relative movement between parts also results in wear which may further aggravate these difficulties. A variety of attempts to improve bobbin constructions in the particulars just indicated have been made, and with some success. Centrifugally gripping elements have been employed, with considerable reduction in wear and looseness, but without any essential improvement in concentricity. In fact, with most centrifugal gripping spindles, the effect of centrifugal force is generally to assist any unbalance which may exist and to increase eccentricity up to the limits of movement permitted by the fixed and non-moving parts. Springs or other resilient elements have been utilized but such devices have a tendency to create inherently vibratory conditions and produce wear.

In previous Patent 2,625,335, granted January 13, 1953 for Textile Spool Driving Connection, there is disclosed an improved bobbin utilizing a polygonal drive end structure and the present invention is a further improvement thereon. Essentially, according to the present invention, a plurality (preferably three) symmetrically disposed flats are used for forming a drive connection between spindle and bobbin and the flats and other elements of the bobbin and spindle are so related as to insure a relative position between bobbin and spindle which will be concentric and will provide a solid engagement without any substantial wear between parts.

In the drawing:

FIG. 1 is a central axial section of a bobbin embodying the invention in a preferred form;

FIG. 1-A is a fragmentary view, similar to FIG. 1, but showing a modification;

FIG. 2 is an end elevation of the bobbin of FIG. 1;

FIG. 3 is a section on the line 3—3 of FIG. 1;

Figure 4:
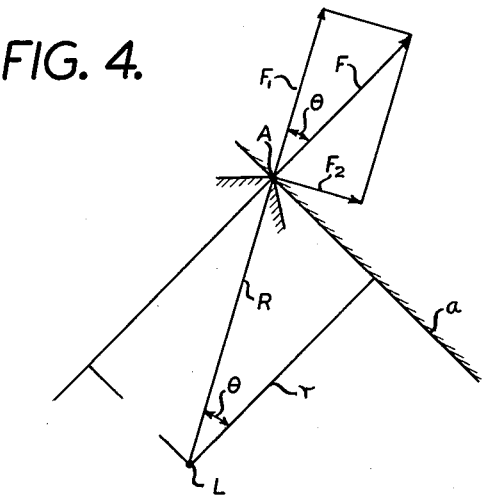
FIG. 4 is a force diagram.

The bobbin comprises an outer barrel 1 which may be of relatively large diameter, as, for example, three and one-half inches for a bobbin about fifteen and one-half inches long and may be provided with one or more internal reinforcing elements 2. An upper spindle bearing 3 is located at a suitable point within the barrel and comprises a molded plastic part equipped with a metal ferrule or fitting 4 providing the necessary dimensional stability for driving and holding the bearing within the barrel (fitting 4 is described in detail in our previous application Serial No. 494,405, filed March 15, 1955 for Spool, now Patent No. 2,953,317 and in itself forms no part of the present invention). The bobbin base comprises a molded plastic plug 5 equipped with a similar metal fitting 6 secured to the plug 5 by a bead 7 pressed into the plug as indicated, the plug being driven into the barrel 1 and held therein as more fully described in the just mentioned application. Internally, plug 5 is formed with three flats $a$, $b$, $c$ connected by three circular or cylindrical sections 8. The drive lug, which is normally of metal, has the configuration of a circular section with flats ground on it, so that it also consists of flats as indicated at 9 connected by circular arcs as indicated at 10 and defining between them the drive vertices A, B and C (this assumes clockwise rotation as viewed in FIG. 2; for counter clockwise rotation, the active vertices will, of course, be at the opposite ends of the flats 9). A clearance between arcs 8 and 10 in the neighborhood of .002 inch or thereabouts is readily obtained, and this limits the relative positions which may be assumed by the bobbin as placed upon the spindle. It will be noted that the clearance between flats $a$, $b$, $c$ and flats 9 is in no sense critical, as the bobbin will center provided the lug flats and recess flats are equidistant from the lug and recess centers and symmetrical about those centers, and regardless of the clearance between the flats, within fairly wide limits. In the bobbin shown, the clearance may conveniently be about .012 inch, and a reasonably large clearance is advantageous in locating the points of engagement of the lug vertices A, B, C with the flats $a$, $b$, $c$ a degree or two away from the points where the flats $a$, $b$, $c$ blend with or meet the rounds 8, as the precise contours at these meeting points are difficult to control with the desired accuracy.

The relatively thick walled drive plug 5 provides reinforcement for the bobbin while at the same time reducing the drive radius so as to improve the centering action. Secondly, the plug is made of such thickness as to permit securing the metal fitting 6 by means of its bead 7 and driving the plug into the barrel, without any objectionable deformation of the plug recess which fits the drive lug. It is found in practice that the bobbin of the invention invariably centers, assuming a symmetrical position with vertices A, B, C engaging flats $a$, $b$, $c$, as opposed to alternative eccentric positions, and this centering takes place almost instantaneously as the spindle comes up to operating speed.

Figure 5:
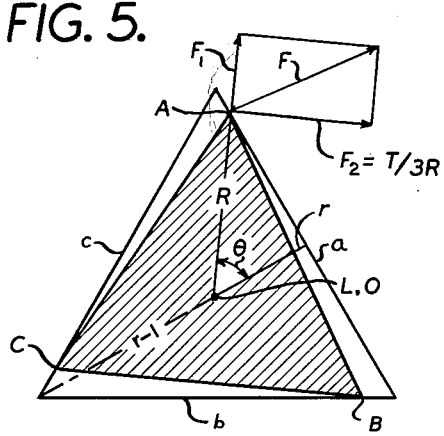
FIGS. 5, 6 and 7 are diagrams illustrating certain possible types of engagement between a bobbin drive end having symmetrical flats and a spindle whorl engaging therewith.

It will be observed that the configuration of the drive end of the bobbin of FIGS. 1–3 is essentially triangular. In other words, the desired operating relationship between parts is such as illustrated in FIG. 5 and is essentially the type of engagement obtained between a large equilaterally triangular recess or socket and a smaller triangular lug, the corners A, B, C of the lug engaging the flats $a$, $b$, $c$ of the bobbin drive end, and the relative angular positions of the two triangular configurations when engaged depending essentially upon the dimensions of the triangles involved or the radii R, r–1 of the respective circumscribed circles of the triangles A, B, C and $a$, $b$, $c$. Obviously, the radius R of the drive lug must have a value somewhere between the inscribed and circumscribed radii r and r–1 of the drive end recess. Returning for the moment to FIG. 3, it will be seen that the flats $a$, $b$, $c$, if continued, will form a triangular configuration such as shown in FIG. 5, and that if the corners A, B, C of the drive lug engage these flats symmetrically, which is the desired condition, the condition presented is essentially similar to the simplified diagram of FIG. 5, the radius R in the case illustrated being (very closely) the inscribed radius $r$ divided by cosine 60° and being also (very closely) the circumscribed radius $r-1$.

FIG. 4 illustrates in diagrammatic form the forces involved in the engagement of a drive lug vertex A with the flat $a$ of a drive end recess and the relationship of these forces to the geometry of the elements. L being the lug center, R the lug radius and $r$ the perpendicular distance to the flat $a$, it is apparent that the cosine of angle $\theta$ between these two radii is $r/R$. The normal force F being perpendicular to the flat $a$ can be resolved according to the vector diagram of the figure into a radial force $F_1$ and tangential or circumferential force $F_2$, equal respectively to $F \cos \theta$ and $F \sin \theta$. Since the one force tends to shift the bobbin laterally and the other tends to accelerate it angularly, it is apparent that the centering action depends on the relation between these forces and hence on the angle $\theta$.

Figure 6:
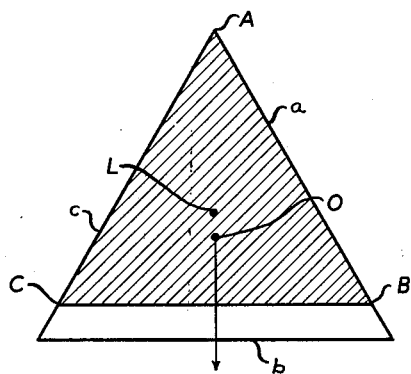
Figure 7:
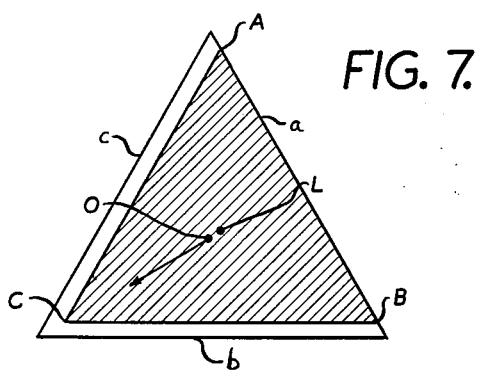

These dimensional relationships, as well as the absolute values of dimensions in question have been found to be of critical importance, for reasons which will now be pointed out in some detail in connection with the simplified diagrams of FIGS. 5, 6 and 7.

As noted in the simplified diagram of FIG. 5, the engagement of the vertices of the drive lug with the flats of the bobbin recess is symmetrical, and in consequence, the bobbin is well centered and driven without looseness and sloppiness of fit, so that vibration and wear are reduced to a minimum. However, assuming an initial clearance between parts, the position of the bobbin recess with reference to the drive lug member when the bobbin is initially placed upon the spindle is essentially a random position (within the possibility of relative movement permitted by the clearances in general) and there exists the possibility that the bobbin will not actually assume the proper drive position of FIG. 5. Instead, a position such as shown in FIG. 6 is possible. It will be noted that once such a position is assumed, it can be a stable one although eccentric. With vertex A fitting into the recess vertex between flats $a$ and $c$, the bobbin center O is located on the far side of the drive lug center L, so that centrifugal force will tend, once the position of FIG. 6 has been taken, to maintain the parts in that position.

Another conceivable position possessing stability is that shown in FIG. 7. Here again, the position of the bobbin center O is such as to tend to maintain the parts in the eccentric position shown, due to the action of centrifugal force. As will now be apparent, it is necessary in addition to providing parts capable of the type of engagement shown in FIG. 5 to insure that the bobbin if placed upon the spindle in a random fashion will find a position such as shown in FIG. 5 rather than a position such as shown in FIGS. 6 and 7. It may be noted that certain apparently simple expedients for insuring this are not actually effective in practice. For example, a mere rounding off of the corners of the flat triangle as shown in the bobbin of FIGS. 1–3, or the provision of a spindle bearing toward the base of the bobbin, which will have a similar effect, although it apparently eliminates the possibility of an eccentric position such as shown in FIGS. 6 and 7, may actually create the possibility of other eccentric positions in which a relatively stable support is obtained by a combination of engagement of the lug with the recess flats and rounded whorl areas or a combination of either or both of these types of engagement with engagement between the spindle and an adjacent bearing.

Regardless of the initial positioning of the bobbin, and assuming a possibility of a symmetrical engagement such as indicated in FIG. 5, the initial turning of the spindle will bring the vertex of a drive lug (and generally only one such vertex) into contact with a flat of the bobbin drive recess, as indicated in FIG. 4, and in so doing will exert a thrust, which may be assumed to be at right angles to the flat, as indicated by the force vector F. This vector may be resolved into a radial component F–1 with respect to the lug center and having a value $F \cos \theta$ and a circumferential component F–2 having a value $F \sin \theta$, which latter component gives rise to a couple equal to $RF \sin \theta$. The force F–1 tends to shift the bobbin bodily in the approximate direction of the lug radius, bringing the center O closer to center L, while the force F–2 tends to cause rotation of the bobbin with the drive lug. The first action, with any combination of symmetrical flats and driving vertices, will lead to an engagement of the type as shown in FIG. 5, while the latter action will set the bobbin into rotation, permitting it to shift under the action of vibration in a random manner, so that it may end up in an eccentric position such as indicated in FIGS. 6 and 7. It will be observed that the smaller the angle $\theta$, the larger the displacing force F–1 will be with relation to the rotating force F–2. It will also be noted that any roughness in parts assists the rotating force, as also does the friction between the bobbin base and the surface on which it rests, requiring a smaller angle $\theta$ than would be the case if only the engagement of a vertex with a theoretically smooth flat were in question. It is found in practice that an angle $\theta$ of 45° or less and preferably 30°, or somewhat less, is ordinarily satisfactory. In addition, it will be noted that the turning couple exerted on the bobbin is proportional to the radius R, so that reduction of this radius also tends to insure the achievement of the desired centering effect. In the bobbin structure shown in FIGS. 1–3, the engagement angle $\theta$ is substantially 30°, and the radius R has a value only slightly more than half the bobbin radius, thus very much reducing the circumferential drive component as compared with the laterally shifting or centering action.

In operation, assuming a properly centered bobbin rotating at operating speed, it will be apparent that the torque between spindle and bobbin will equal the yarn tension multiplied by the radius of the bobbin (or of the body of yarn already wound on the bobbin) plus the air resistance to rotation of the bobbin and yarn thereon. This torque may be of the order of only a few inch-ounces, as, for example, with about 5 oz. tension and a bobbin of the size indicated, the torque may be about 10 inch-ounces or somewhat less. Essentially, this torque must be utilized for maintaining a firm grip of the drive lug against the recess flats against any inertial effects tending to shift the bobbin with relation to the spindle. While the torque increases as more yarn is wound on the bobbin, so also does the bobbin inertia, so that the situation is not essentially improved.

Considering now a bobbin with three flats $a, b, c$ engaged and driven by three vertices A, B, C in a centered position, it will be apparent that there is a circumferential force F–2 at each point of engagement equal to $T/3R$, where T represents the total driving torque. The forces F–1 at the three points of engagement will balance each other and the normal pressure of a vertex A, B or C against its flat $a$, $b$ or $c$ will be $T/3R \div \sin \theta$. As will be apparent, the normal force F against a flat being inversely proportional to the radius R and to $\sin \theta$, for given torque, this normal force is increased by reducing either or both of the radius R or the angle $\theta$. It is found that the construction of the invention not only insures proper centering on starting up but also insures a firm grip of lug against recess while running, preventing eccentricity, looseness and wear.

Figure 8:
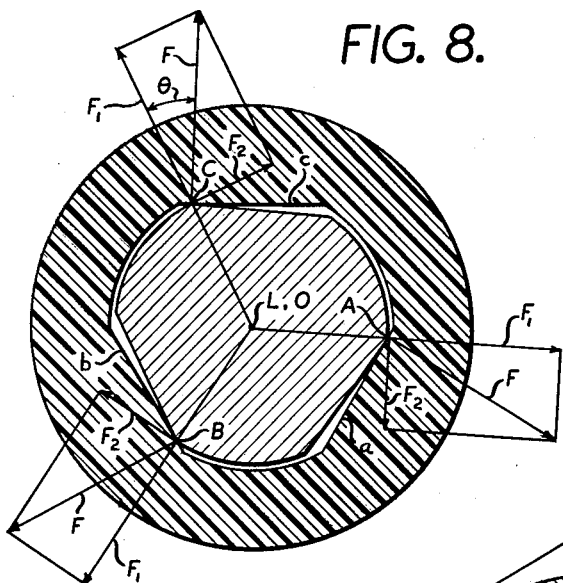
FIGS. 8, 9 and 10 are diagrams illustrating various positions of engagement of the drive lug and bobbin end recess of the invention.

As shown in FIG. 8, the driving position of the parts involves an engagement of the spindle base vertices A, B and C with the bobbin drive end flats, $a$, $b$ and $c$ in a symmetrical manner. At each point of engagement, the normal force F exerted against the flat will be resolved into a radial vector F–1 and a circumferential vector F–2. The vectors F–1 being equal in magnitude and directed through the center L of the whorl cancel out or balance each other, having thus no net effect in tending to shift the position of the bobbin with respect to the spindle. Vectors F–2, being directed in the same direction around the center L, produce a turning couple or torque, maintaining the rotation of the bobbin against the yarn tension and air resistance. As will be apparent, the angle θ is approximately 30°, thus providing the desirable conditions of engagement discussed above.

Figure 9:
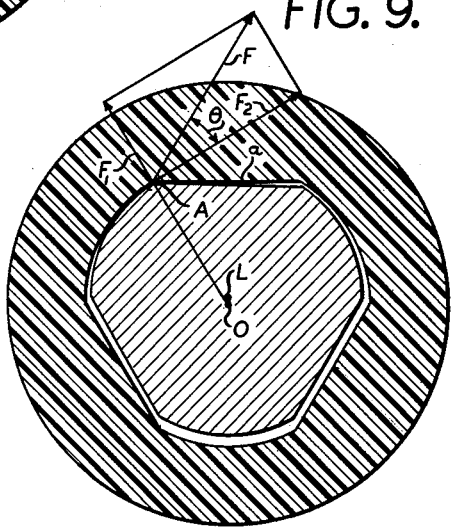
Figure 10:
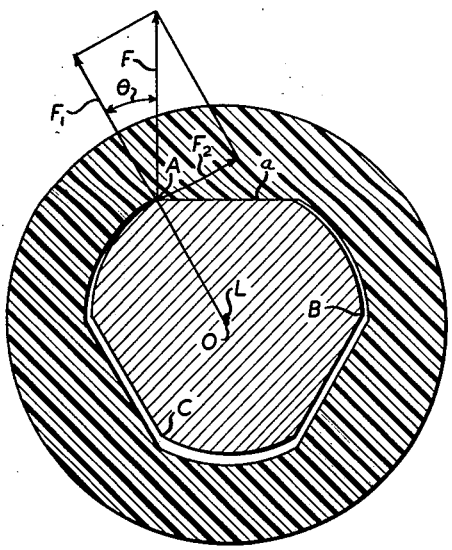

FIG. 9 illustrates one possible condition of starting engagement in which a vertex A engages a flat a, but the parts are initially not centered so that there is only a one point engagement to start with. In this case, the magnitude of angle θ, as above mentioned, being about 30° and the radial vector F–1 exceeds the circumferential vector F–2 so that the initial rotation of the lug moves the bobbin end laterally, bringing center O toward center L and producing the type of engagement shown in FIG. 8. In another possible starting position, a flat of the lug may engage against a flat a of the bobbin end. However, in this case also, the situation is not essentially altered and the force vectors are approximately as indicated in FIG. 9, so that again the centered position of FIG. 8 is produced as the parts start to rotate. It is found that in actual operation of the construction of the invention, as the spindle commences to rotate, the bobbin centers very quickly and is thereafter engaged in a solid and stable manner, eliminating both eccentricity and looseness or relative movement between parts.

FIG. 1–A illustrates a modified form of the invention in which the initial positioning function of the concentric arcuate sections 8 and 10 of the bobbin end and lug is supplemented or replaced by the action of a spindle bearing element 20 fitting the spindle with any required degree of closeness. If, for example, the element 20 has a clearance of about .002 inch around the spindle and is located down close to the end of the bobbin, as shown, the initial centering action is equivalent to that of the concentric surfaces 8. In this case, the clearance between surfaces 8 and 10 may be increased as convenient, without affecting the centering action in any appreciable degree.

What is claimed is:

1. In a textile machine, and in combination, a bobbin and spindle for driving the same, the bobbin having a drive end engaging the spindle adjacent to its base, the drive end comprising a plurality of flats disposed symmetrically about the bobbin axis, and the spindle base comprising a lug having a corresponding plurality of vertices for engaging the flats, and means for positioning the bobbin with relation to the spindle when placed thereon, the last said means comprising lug portions between vertices conforming generally to the contour of the drive end, the lug portions opposite the flats having a predetermined clearance therefrom, and other portions having a lesser clearance from the drive end surfaces opposite them.

2. In a textile machine, and in combination, a bobbin and spindle for driving the same, the bobbing having a drive end recess and the spindle having a base drive lug engaging in said recess, the recess comprising a plurality of symmetrical flats and the lug comprising a corresponding plurality of vertices engageable with said flats but spaced from said flats in directions perpendicular to the respective flats by a predetermined clearance distance when the bobbin is turned back from driving engagement position on the lug, and concentric means on the bobbin and spindle also adjacent the base and having a lesser clearance between them than the said predetermined clearance.

3. In a textile machine, and in combination, a bobbin and spindle for driving the same, the bobbin having a drive end for engaging a spindle and the spindle having a base drive lug engaging in the said end, the said end and lug comprising a plurality of flats on the bobbin symmetrically disposed about the bobbin axis and a plurality of vertices engageable with the said flats and having clearance permitting a limited turning movement of the bobbin in centered position on the spindle as well as a predetermined lateral movement of the bobbin drive end with respect to the lug when turned back from engaging position, and the bobbin and spindle also comprising means adjacent the bottom of the bobbin concentric with the bobbin axis and spindle axis respectively and having a clearance substantially less than the said predetermined lateral movement.

References Cited in the file of this patent
UNITED STATES PATENTS

| | | |
|---|---|---|
| 1,424,211 | Pugh | Aug. 1, 1922 |
| 2,359,604 | Atwood | Oct. 3, 1944 |
| 2,625,335 | Atwood | Jan. 13, 1953 |
| 2,634,991 | Stevens | Apr. 14, 1953 |
| 2,668,020 | Dunlap | Feb. 2, 1954 |